United States Patent [19]

Wanlass

[11] Patent Number: 5,057,953
[45] Date of Patent: Oct. 15, 1991

[54] HEAD SLIDER SUSPENSION ASSEMBLY LOAD BEAM HAVING A FUNDAMENTAL MODE VIBRATION CHARACTERISTIC IN THE RANGE OF ABOUT 2000 HERTZ TO ABOUT 4000 HERTZ

[75] Inventor: Dana T. Wanlass, Santa Barbara, Calif.

[73] Assignee: Applied Magnetics Corporation, Goleta, Calif.

[21] Appl. No.: 576,281

[22] Filed: Aug. 31, 1990

Related U.S. Application Data

[62] Division of Ser. No. 176,037, Mar. 31, 1988, Pat. No. 4,992,898.

[51] Int. Cl.$^5$ .......................... G11B 5/48; G11B 21/16
[52] U.S. Cl. ...................................... 360/104; 360/103
[58] Field of Search ............... 360/104, 103, 107, 109, 360/77.16

[56] References Cited

U.S. PATENT DOCUMENTS

| | | | |
|---|---|---|---|
| 4,080,636 | 3/1978 | Ravizza | 360/107 X |
| 4,093,885 | 6/1978 | Brown | 360/77.16 X |
| 4,099,211 | 7/1978 | Hathaway | 360/107 X |
| 4,106,065 | 8/1978 | Ravizza | 360/107 X |
| 4,167,765 | 9/1979 | Watrous | 360/104 X |
| 4,250,530 | 2/1981 | Yang | 360/102 X |
| 4,535,235 | 5/1980 | Stolloiz | 360/104 X |
| 4,543,374 | 8/1985 | Anderson et al. | 360/104 X |
| 4,620,251 | 10/1986 | Gitzendanner | 360/103 |
| 4,630,158 | 12/1986 | Spash | 360/105 X |
| 4,631,610 | 12/1980 | Kobayashi et al. | 360/104 |
| 4,724,500 | 2/1988 | Dalziel | 360/103 |
| 4,734,805 | 3/1988 | Yamada et al. | 360/104 |
| 4,774,610 | 9/1988 | Kinto | 360/104 |
| 4,809,104 | 2/1989 | Knudsen | 360/104 |
| 4,814,906 | 3/1989 | Suzuki et al. | 360/103 X |
| 4,829,395 | 5/1989 | Coon et al. | 360/104 |
| 4,853,812 | 8/1989 | Daito et al. | 360/104 |

*Primary Examiner*—John H. Wolff
*Attorney, Agent, or Firm*—Daniel J. Meaney, Jr.

[57] ABSTRACT

A load beam adapted for use in a head slider suspension assembly is shown. The load beam has a generally rectangular shape and includes a member for defining a support arm end and a head/slider loading end. The load beam has a torsional vibration mode characteristic which, upon said load beam being excited by a driving force, produces a fundamental mode vibration in the range of about 2000 hertz to about 4000 hertz and higher order mode vibrations above about 6000 hertz. In the preferred embodiment, the load beam has at least one load rail extending substantially perpendicular therefrom. The at least one load rail can be selected to extend from the load beam in a direction the same as or opposite to the direction in which a head/slider assembly is supported from a head/slider loading end of the load beam.

20 Claims, 5 Drawing Sheets

HEAD SLIDER SUSPENSION ASSEMBLY LOAD BEAM HAVING A FUNDAMENTAL MODE VIBRATION CHARACTERISTIC IN THE RANGE OF ABOUT 2000 HERTZ TO ABOUT 4000 HERTZ

This is a division of application Ser. No. 07/176,037 filed Mar. 31, 1988, which issued as U.S. Pat. No. 4,992,898 on Feb. 12, 1991.

BACKGROUND OF THE INVENTION

1. Field of the Invention

This invention relates to a magnetic head slider suspension assembly for supporting a head slider in coacting relationship, through an air bearing surface, onto the surface of a rotating magnetic disc, and more specifically, relates to a magnetic head slider suspension assembly for supporting a head slider in a single or multi-disc rotating assembly wherein the head slider suspension assembly includes, in the preferred embodiment, a pair of spaced, raised load rails which extend in the same direction as that of a head slider operatively attached to the head/slider loading end. In one embodiment, the height of the load rails may vary from a predetermined height near the head/slider loading end of the central arm section to a selected height near the support end. The load rails define an outer edge that can be of a uniform height, a continuously tapered edge, a stepped edge, or a combination of a stepped edge and tapered edge. The structure of the outer edge permits the adjacent head slider suspension assembly to be moved into an unloaded position wherein the surface of the load beam, located opposite to the surface supporting these load rails, coact at the head/slider loading end. This enables adjacent head sliders to be deflected towards each other and away from the rotating disc surface during insertion and removal of the magnetic head slider suspension assembly, having head slider attached thereto, into and from single or multi-disc rotating assemblies. The amount of deflection at the head/slider loading end is not influenced by the height of each of the load rails at the head/slider loading end.

2. Description of Prior Art

The use of a magnetic head slider suspension assembly for loading and unloading a head/slider onto a rotating disc is known in the art. One such magnetic head slider suspension assembly is used in the IBM standard 3370 Type Suspension Assembly.

Certain of the prior art magnetic head slider suspension assemblies include an elongated slider arm having a central arm section, or a load beam, and a pair of spaced, uniform height, raised load rails which extend in a direction away from the head slider operatively attached to the head/slider loading end. The spacing between co-axially aligned rotating discs, in the prior art multi-disc rotating memory assemblies, are typically in the order of 250 mils (6.35 mm). The above-described raised load rails, having uniform height of about 30 mils (0.76 mm), are used to provide stiffening of the load beam which supports the head slider suspended therefrom onto the rotating disc surface. In the prior art devices, sufficient spacing exists between adjacent surfaces of rotating disc to accommodate movement of the head sliders from a "loaded position", that is where the air bearing surface of a head slider is positioned to fly over the surface of the disc, away from the disc surface into as "unloaded position", that is where the head slider is positioned away from the disc surface. The head sliders are positioned in the "unloaded position" during insertion and removal of the head sliders from a multi-disc rotating assembly in order to prevent the head slider from contacting the surface of a magnetic disc. In applications having limited disc spacing, the uniform height, raised load rails of the prior art devices limit the degree of movement or rotation of the magnetic head slider suspension assemblies between the "loaded position" and the "unloaded position".

The prior art magnetic head slider suspension assemblies include uniform height, raised load rails which extend substantially perpendicular from the central arm section or load beam, and which extend from the central arm section in a direction opposite to the direction of a head slider operatively attached to the head slider loading end. In such applications, the load rails function as a stiffening member at all times during unloading a rotating disc. During operation the load rails restrict movement of the head slider loading end of the head slider supporting the head slider since the head/slider loading end cannot be deflected any further than the height of the uniform load rails.

It is also known in the art for the head slider suspension assembly to have a pair of spaced parallel tapered load rails which extend from the elongated arm in a direction opposite to that of the head slider operatively attached to the head/slider loading end. Such a structure permits larger displacement of the head/slider loading end where the same is moved into an "unloaded position". Due to the reduction in the height of the load rails at the head/slider loading end, a head slider suspension assembly having tapered height load rails is also smaller in size than the prior art, uniform height load rails.

SUMMARY OF THE PRESENT INVENTION

This invention relates to a new and novel magnetic head slider suspension assembly which is capable of being used in single or multi-disc rotating assemblies having co-axially aligned rotating discs which are designed to have reduced distance or spacing between the surfaces of adjacent discs as compared to prior art assemblies. The structure of the magnetic head slider suspension assembly of the present invention permits larger displacement of the head slider when the same is moved into an "unloaded position." in the preferred embodiment, a pair of spaced, load rails extend from the central arm section of the elongated slider arm in the same direction as that of the head slider adapted to be operatively attached to the head/slider loading end.

The magnetic head slider suspension assembly of the present invention is used for loading a head slider having an air bearing surface onto the surface of a rotating magnetic disc. The magnetic head slider suspension assembly includes an arm mounting support which Is capable of being operatively attached to a loading arm assembly or positioner. The elongated slider arm is operatively attached at one end thereof, to the arm mounting support. The elongated slider arm extends along an elongated axis and includes a central arm section, or load beam, which terminates in two ends. The central arm section includes means for defining at one end thereof a support end having a predetermined width and the support end is adapted to be operatively coupled to an arm mounting support. When the magnetic head slider suspension assembly of the present invention is in an "unloaded position" as defined hereinbefore, the central arm section is capable of being deflected through a predetermined acute angle relative to the support end about a deflection section located slightly forward of the support end. The central arm section is generally rectangular in shape and includes means for defining at its other end a head/slider loading end having a width which could either be the same or less than the predetermined width of the support end. The head/slider loading end is located along the elongated axis of the elongated slider arm and in an opposed spaced relationship to the support end. The magnetic head slider suspension assembly includes at least one raised load rail extending substantially perpendicular from the central arm section and in the same direction as that of the head slider operatively attached to the head/slider loading end. The at least one raised load rail has a length which extends from a first rail end, commencing forward of the deflection section located, to a second rail end located at about the head/slider loading end. The first rail end of the at least one load rail is located forward of the support end has a selected height. The second rail end of at least one load rail is located adjacent to the head/slider loading end and has a predetermined height which may be different than the selected height. In the preferred embodiment, a pair of spaced load rails are used and are positioned to extend substantially perpendicular from the central arm section in the same direction as that of a head/slider to be supported from the head/slider loading end. The outer edge of the spaced load rail may be of uniform height (e.g. rectangular) or may have a tapered or stepped profile as discussed hereinbelow.

The spaced, raised load rails, positioned on the reverse side of the central arm section, function as a stiffening member and are sometimes referred to herein as "inverted load rails." The head/slider loading end of the central arm section is selected to have a dimension to eliminate possible interference with the flexure gimbal and head slider adapted to be attached to thereto.

One disadvantage of the magnetic head slider suspension assemblies of the prior art having uniform height load rails is that, the physical size and structure thereof does not permit the head/slider loading end, and the head slider affixed thereto, to be deflected beyond a distance determined by the height of the uniform load rails. As such, the prior art magnetic head slider suspension assemblies, having head sliders affixed thereto, cannot be inserted into and removed from the advanced state-of-the art devices having closer spacing and distances between adjacent disc surfaces principally because the head slider will contact the disc surface, which is highly undesirable.

Another disadvantage of the prior art magnetic head slider suspension assemblies having uniform height spaced load rails is that the height of load rails, at the head/slider loading end, limits the displacement of the head slider when the same is moved into an "unloaded position". When the spacing between the surfaces of adjacent, rotating disc memories is reduced, say to about 150 mils (3.80 mm), the head sliders are unable to move a sufficient distance away from the disc surface which could result in undesirable contact between the disc surface and the head slider, particularly when the head slider suspension assembly is in the "unloaded position".

Certain of the known prior art head slider suspension assemblies have spaced, raised load rails which extend from the elongated slider arm in a direction opposite to that of a head slider operatively attached to the head/slider loading end wherein the outer edges thereof vary in height with a smaller height being located adjacent to the head/slider loading end. This structure permits adjacent head slider suspension assemblies to be physically moved or displaced over a greater acute angle, compared to the displacement of a head slider suspension assembly having uniform height load rails, at the head/slider loading end, that limitation being due to the physical limitation that the load rails will contact each other.

In both the uniform height load rail structure and the tapered height load rail structure of the prior art, the spaced, raised load rails provide the required stiffness for the head slider suspension assembly. In both prior art head slider suspension assemblies, the load rails are directed away from the head slider adapted to be attached operatively to the head/slider loading end and away from the disc surface. As such these prior art head slider suspension assemblies add unwanted package height to the profile of the head/slider loading end.

Certain improvements have been made in reducing the height or thickness of single disc drives. As a result of the reduced height of the single disc drives, the thickness of the head slider suspension assembly becomes an important factor in the design of such drives. The head slider suspension assembly of the present invention having inverted load rails can be used in such single disc drives.

Newly developed multi-disc rotating assemblies have increased the number of discs per drive which results in the reduction of disc-to-disc spacing in such assemblies. Heretofore, the limiting factor in the reduction of the disc-to-disc spacing in such drive assemblies has been the physical size of the head slider and head slider suspension assembly in the "Z", or axial direction of the disc package.

For example, one microminimonolithic head slider has height, in the "Z" direction, of 0.034 in. (0.86 mm). This microminimonolithic head slider has resulted in the disc-to-disc spacing being reduced to 0.170 in. (4.32 mm) Further reduction of spacing in the "Z" direction has not been possible since any reduction in the size of the load rails in the head slider suspension assembly would result in subsequent loss of support beam stiffness.

The new and novel head slider suspension assembly of the present invention overcomes the above disadvantages of the prior art devices and provides an improved head slider suspension assembly which can result in further reduction in the "Z" height of 120 mils (3.04 mm) to 150 mils (3.80 mm), depending upon the head slider chosen, while maintaining support beam stiffness.

One advantage of the present invention is that reversed or inverted spaced load rails provide a means for maintaining the required stiffness of the elongated support arm while providing a smaller dimensional profile than prior art head slider suspension assemblies.

Another advantage of the present invention is that the outer edge of the inverted or reversed spaced raised load rails may be continuously tapered from a predetermined height, near the head/slider end, to a selected height at the support end, wherein the selected height is less than the predetermined height, to offer increased load rail-to-disc clearance in applications where suspension assembly-to-arm mounting position is not well controlled. In certain applications, the outer edge may be of uniform height between the support arm end and the head/slider loading end.

Another advantage of the present invention is that the reversed or inverted load rails are directed towards the disc surface, placing the load rails physically in a space that was not otherwise used such that the load rails extend in the same direction as that of a head slider operatively attached to the head/slider loading end.

Another advantage of the present invention is that the disc-to-disc spacing using the head slider suspension assembly of the present invention can be reduced to approximately 0.118 inches (3.00 mm) while maintaining the desired support beam stiffness.

Another advantage of the present invention is that one embodiment of the invention may use a continuous taper formed on the edge of the reversed or inverted spaced rails may have a range of angles in the order of about 5 minutes of arc to about 45 minutes of arc.

Another advantage of the present invention is that a pair of inverted spaced raised load rails may be used wherein each of the outer edges of each spaced, raised load rail may have one or more stepped edges intermediate the support end and head/slider loading end. In one embodiment, the height of the intermediate stepped edge may be equal to the difference in height between the predetermined height of the load rails at the support end and the selected height of the head/slider loading end. The location of the step must be sufficiently inward from the support end and towards the head/slider loading end so as to permit sufficient clearance of the head slider suspension assembly from the surface of the adjacent disc to avoid contact therebetween in applications with large potential mounting error.

Another advantage of the present invention is that the height of the intermediate stepped outer edge may be less than the difference between the predetermined height of the head/slider loading end and the selected height of the support end and that a portion of the outer edge is formed or tapered to compensate for the height differences.

Another advantage of the present invention is the height of the reversed or inverted load rail of the head slider suspension assembly is sufficiently large to provide the rigidity required for supporting a head slider at the support end and the positioning of the load rails towards this disc surface provides the additional spacing required to accommodate the smaller distances required in advanced minimalized package height design in improved state-of-the-art single or multi-disc rotating memory assemblies.

Another advantage of the present invention is that the head/slider loading end of the central arm section or load beam may be of the same or substantially the same geometrical dimension, e.g., width, as that of the support end. Certain factors may determine the most desirable width of the head/slider loading end such as, for example, the closeness of the track having the smallest radius on a rotating disc nearest the hub of the disc drive. In such applications, the width of the head/slider loading end would be selected of a dimension to avoid head/slider loading end-to-hub contact while the head slider suspension assembly is positioning the head/slider, attached to the head/slider loading end thereof, in an appropriate transducing relationship with the smallest radius track.

Another advantage of the present invention is that the structure of the central arm section or load beam has a support end and head/slider loading end having substantially the same geometrical dimension as that of the support end making the same generally rectangular in shape. Thus, when the head slider suspension assembly is activated by the disc positioning system to move the head slider to a different position relative to the disc, second order or higher mode vibrations are experienced by the central arm section or load beam but they occur above 6,000 hertz. Thus, in the frequency band of the 0 hertz to about 6,000 hertz the second or higher order mode vibrations are eliminated. This results in a faster settling time of the head slider suspension assemblies enabling the disc drive to have faster response times for data transfer and the elimination of electrical filters heretofore required for suppression of second order or higher harmonics from the driver electronics feedback servo system of the positioning system.

BRIEF DESCRIPTION OF THE DRAWING

These and other advantages of the present invention will become apparent when considered in light of the detailed description of the preferred embodiment hereinbelow, which includes the following figures.

DESCRIPTION OF THE PREFERRED EMBODIMENT

Figure 1:
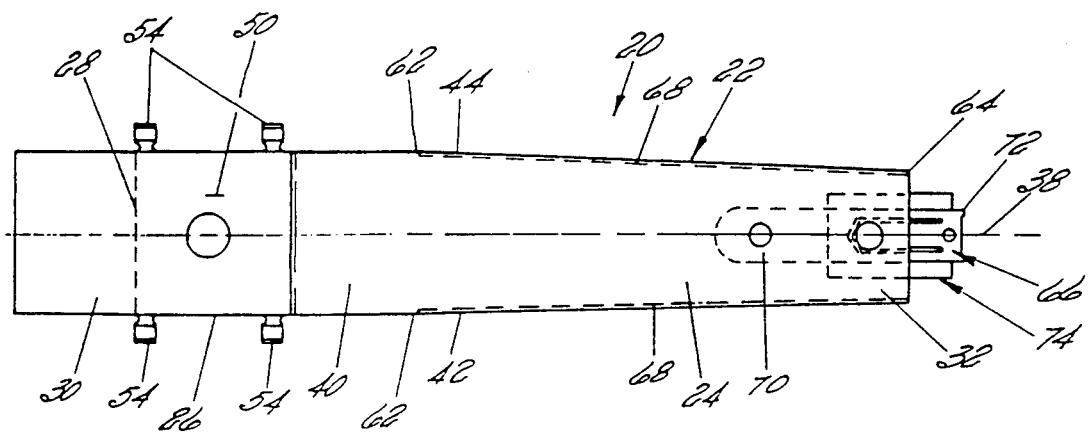
FIG. 1 is a top plan view of a magnetic head slider suspension assembly having a support arm with inverted spaced load rails and a flexure gimbal operatively attached thereto, which flexure gimbal having a head slider operatively attached thereto.
Figure 2:
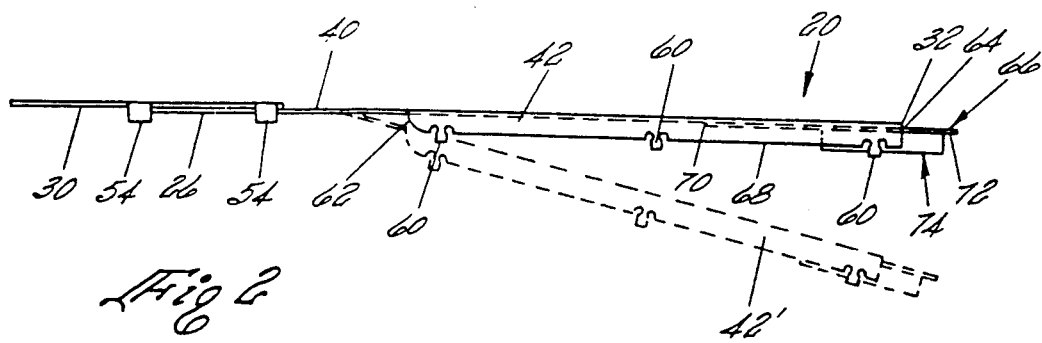
FIG. 2 is a side plan elevational view of the head slider suspension assembly, having a central arm section or load beam, as shown in FIG. 1, operatively attached to an arm mounting support and with the free position thereof shown by dashed lines.

FIGS. 1 and 2 illustrate a formed or assembled magnetic head slider suspension assembly shown generally by arrow 20. The magnetic head slider suspension assembly 20 is adapted for loading a head slider, having one or more air bearing surfaces, onto the surface of a rotating magnetic disc. Typically, the magnetic head slider suspension assembly has a head slider affixed thereto, and such an assembly is used in "Winchester" type, rotating magnetic disc systems.

In the preferred embodiment illustrated in FIG. 1, the magnetic head slider suspension assembly includes an elongated load arm 22 having a central arm section 24 (sometimes referred to herein as a load beam) which extends along an elongated axis 38 of the elongated slider arm 22. The central arm section 24 includes means for defining at one end thereof a support end 26. The support end 26 has a predetermined width, shown as 28, and the support end 26 is adapted to be operatively coupled to an arm mounting support 30. The central arm section 24 further includes means for defining at the other end thereof a head/slider loading end 32. The central arm section 24 has a deflection section, shown as number 40, which permits or enables the central arm section 24 to be deflected about a deflection line within the deflection section 40. The deflection section 40 is located slightly forward of the support end 26, that is towards the head/slider loading end 32. The angle of deflection in the "free position", that is the unrestrained position assumed by the central arm section in the absence of a loading force, is in the range of about 5 degrees to about 25 degrees, and this is illustrated in greater detail in FIG. 2. The preferred angle of deflection will vary depending on the desired head slider load force during operation.

The width of the head/slider loading end 32, depending upon the application, is less than the predetermined width 28 of the support end 26. The head/slider loading end 32 is located along the elongated axis 38 which extends from the support end 26, through the central arm section 24 to the head/slider loading end 32. The width of the head/slider loading end 32 may be equal to or less than that of the support end 26. The exact width of the head/slider loading end is determined by the position of the track closest to the rotating hub of a rotating memory. The radius of the track of recorded information determines the distance between that track and edge of the rotating hub. The head slider must be positioned relative to the track by the positioning system. The width of the head/slider loading end of the central arm section 24 must be selected to have a width, when the head slider is positioned over the smallest radius track, such that the head/slider loading end does not engage or contact the hub. Preferably, the width of the head/slider loading end 32 is slightly less than the width of the geometrical dimension of the support end 26 in order to avoid contact with the hub.

As illustrated in FIG. 2, the support end 26 is operatively attached, such as by being welded or by adhesive bonding, to a support arm 30 at interface 50.

Four extended arcuate-shaped cable clamps 54 are located, two each, on each side of the support end 26. The extended arcuate-shaped cable clamps 54 are shown in detail in FIG. 8.

A pair of reversed or inverted spaced, raised load rails 42 and 44 extend substantially perpendicular from the central arm section 24. In the embodiment of FIG. 2, the load rails 42 and 44 have a uniform height. Each of the load rails 42 and 44 have a length which extends from a first rail end 62 located forward of the deflection section 40. Deflection section 40 is located slightly forward of the support end 26 and towards the head/slider loading end 32. The central arm section 24 is capable of being deflected downward at an acute angle at the deflectable section 40 as shown in greater detail in FIG. 3. The first rail end 62 of each of the load rails 42 and 44 is located slightly forward or beyond the deflection section 40 so as to not interfere with the ability of the central arm section 24 to be deflected about the deflection section 40 at a predetermined minimal acute angle. The load rails 42 and 44 terminate in a second rail end 64 located adjacent the head/slider loading end 32. The height of the load rails 42 and 44 at the second rail ends 64 have a predetermined height, which, in the preferred embodiment, is in the order of 0.030 mils (0.75 mm). The height of the load rails 42 and 44 near the first rail ends 62 has a selected height which may be different than the predetermined height of the second rail end 64, but in this embodiment, the heights are uniform. In the preferred embodiment, the uniform height is in the order of 0.030 mils (0.75 mm). Thus, the load rails 42 and 44 has its outer edge 68 extending from the predetermined height at the second rail end 64 to the same height at the first rail end 62.

Figure 17:
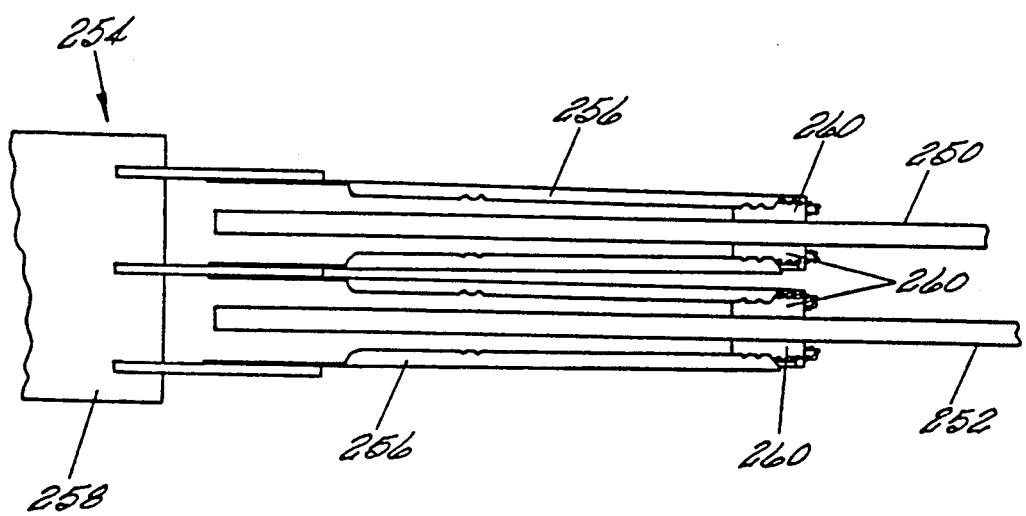
FIG. 17 is a front plan pictorial representation of a multi-disc rotating memory assembly including an actuator having a support block for supporting a plurality of head/slider suspension assemblies in a "loaded position" enabling the head slider to fly on an air bearing surface over the surface of discs.

In the preferred embodiment of FIGS. 1 and 2, the pair of spaced, raised load rails 42 and 44 are positioned to extend from the central arm section 24 in a direction towards the disc surface which is in the same direction as that of the head/slider supported from the head/slider loading end 32 as illustrated in FIG. 17. In the structure the raised load rails 42 and 44 function as stiffening members for a cantilever beam, e.g. load arm, to provide structural rigidity to the central load arm section 24. It is envisioned that the structure of each load rail could be different. For example, one load rail could be of uniform height between the first rail end and second rail end while the other load rail could have a continuous taper, be stepped, or have some other structure which would make the height or the load rail near the support end equal to or less than the height at the head/slider loading end.

Heretofore, the space located between the head slider suspension assembly and the disc surface was an unused or dedicated open space. The dimension of the dedicated open space had to be included in the disc-to-disc spacing limitations in multi-disc rotating assembly designs and, as such, was one of many limitations which restricted or inherently limited the minimum achievable disc-to-disc spacing. Thus, inverting the spaced load rails to place the same in this dedicated open space achieved several results; namely: (1) the inverted spaced load rails are positioned in the dedicated open space to maximize use of the same: (2) the height of the spaced load rails is eliminated as a major limitation in reducing the disc-to-disc spacing, a highly desirable advantage; and (3) the preferred embodiment of the head slider suspension assembly can utilize a pair of inverted spaced load rails having a uniform height, or differing heights, to obtain the desired stiffness for the head slider suspension assembly.

It is envisioned that the central arm section, or the entire head slider suspension assembly could be fabricated of a material selected to have a desired stiffness such that the desired load beam stiffness could be obtained by the use of one inverted load rail. This is referred to herein as "at least one load rail". The head slider suspension assembly could be stamped or chemically etched from a stainless steel, such as for example SST 302/304 which can be acquired from a number of manufacturers. However, it is envisioned that the same could be fabricated from other suitable materials or alloys, or could be fabricated as a laminated structure. The choice of material, structure, stiffness and the like of the head slider suspension assembly would be determined by the specific application, specifications of the multi-disc rotating assembly and the like, all as is well known to those skilled in the art.

Each of the inverted load rails 42 and 44 have a plurality of deflectable cable clamps 60 integral therewith which are used to hold a cable extending from the head/slider loading end 32 to the support end 26 as shown pictorially in FIG. 17.

A flexure gimbal 66 having a first end 72 and a second end 70 is operatively attached to the head/slider loading end 32.

A head slider 74 having one or more air bearing surfaces is adapted to be operatively attached to the first end 72 of the flexure gimbal 66. The surface of the head slider, which is adapted to be positioned in an opposed spaced relationship to the disc surface, may have one or more air bearing surfaces depending upon the structure of the entire surface. Typically, air bearing surfaces are formed on load rails which fly the magnetic head slider suspension assembly over the disc surface. Depending upon the design, the surface of the magnetic head/slider has an air bearing surface, which may be two or more discrete surfaces, all of which function aerodynamically to enable the magnetic head/slider to fly on an air bearing surface formed between the magnetic head slider and rotating disc.

The second end 70 of the flexure gimbal 66 is operatively attached to the head/slider loading end 32 to form a cantilever loading beam structure where in the first end 72 of the flexure gimbal 66 extends beyond the head/slider loading end 32 of the central arm section 24. The magnetic head slider is adapted to flex the flexure gimbal 66 as the magnetic head slider suspension assembly flies, on the air bearing surface, on the rotating magnetic disc so that the head slider suspension assembly and the flexure gimbal combined movements permit the head slider to comply with variations in the disc surface. This structure for operatively attaching the head slider 74 to the flexure gimbal is shown in greater detail in FIG. 16.

FIG. 2 illustrates the assembled magnetic head slider suspension assembly of FIG. 1 with the arm mounting support 30 operatively attached to the support end 26. The central arm section 24 is capable of assuming a "free position" about the deflection section 40 shown by load rail 42'. When the elongated slider arm is loaded onto the rotating disc, the central arm section 24 is deflected along the deflection section 40 into the "unloaded position" wherein the head/slider loading ends are either adjacent to or in contact with each other. The head/slider loading ends are then moved in a direction towards the "free position" until the "loaded position" thereof is reached wherein the central load sections are substantially parallel to the disc surface as is shown in greater detail in FIG. 17. Design criteria may require a slight angular displacement between the support assembly and disc surface of say in the order of about 20 minutes of arc, and this is deemed to be covered by the term "substantially parallel".

Figure 3:
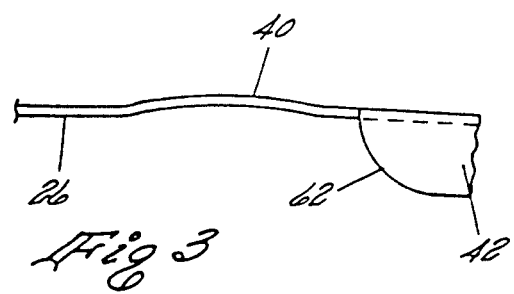
FIG. 3 is partial section side plan elevational review of the support end of the elongated slider arm of FIG. 2 showing the deflection section.

FIG. 3 illustrates that the deflection section 40 is located intermediate to the support end 26 and the first rail end 62 of the spaced, load rail 42. The first rail end 62 is located slightly beyond the deflection section 40 so as not to interfere with the deflection of the central arm section 24 from its "free position", to the "unloaded position" and ultimately into the "loaded position".

Figure 4:
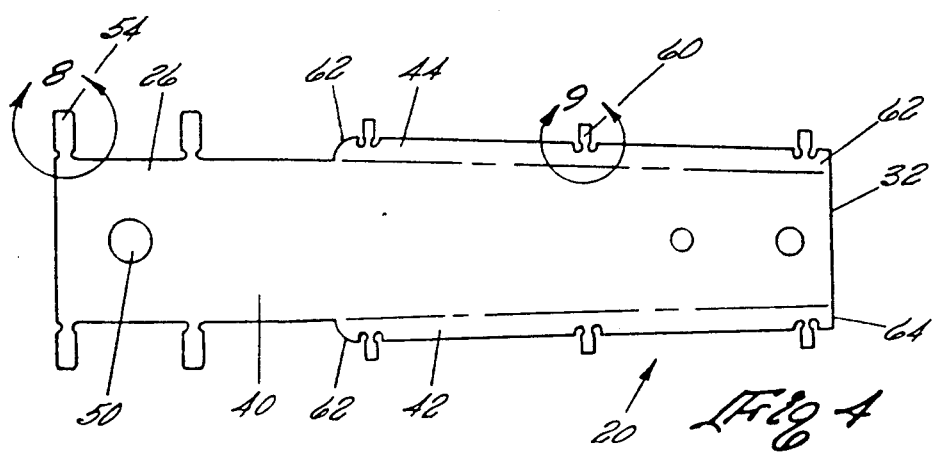
FIG. 4 is a top plan view of an unformed head slider suspension assembly component prior to forming the inverted spaced, raised load rails and two forms of cable clamps.

FIG. 4 is an unformed magnetic head slider suspension assembly showing specifically the elongated slider arm 20 having uniform height load rails and the relationships between the various components thereof. Specifically when the elongated slider arm 20 is fabricated, the central arm section 24, the inverted spaced, raised load rails 42 and 44, the support end 26, the opening 50, the extended cable support 54, the deflectable cable clamps 60, as well as other openings are formed in the arm 20. The unformed arm 20 is processed to bend or deflect the spaced, load rails 42 and 44 in the same direction as the direction in which a head/slider is adapted to be operatively attached to the flexure beam 66. The first rail ends 62 are shown to be slightly arcuate in shape and is sufficiently slightly forward of the deflection section 40 to permit movement of the central arm relative to the support end 26.

Figure 5:
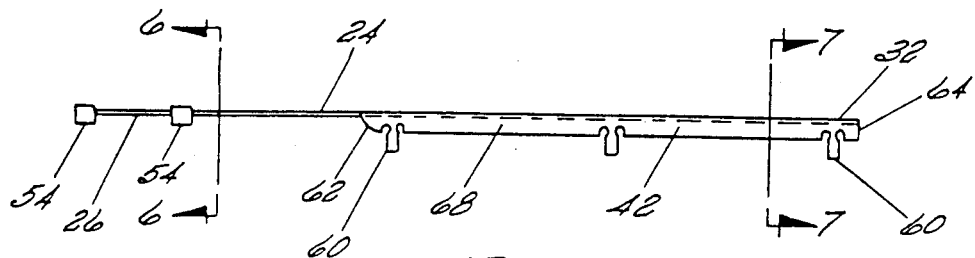
FIG. 5 is a side plan elevational view of a formed elongated slider arm having a uniform height outer edge formed on each of the inverted spaced raised load rails wherein the load rails extend in the same direction as the head/slider operatively attached to the head/slider loading end.

FIG. 5 shows a formed elongated slider arm of the unformed elongated slider arm 20 illustrated in FIG. 4. The reversed or inverted spaced, raised load rail 42 has a first rail end 62 and a second rail end 64. A plurality of deflectable cable clamps 60 are integral with the load rail at several locations in the edge 68.

Figure 6:
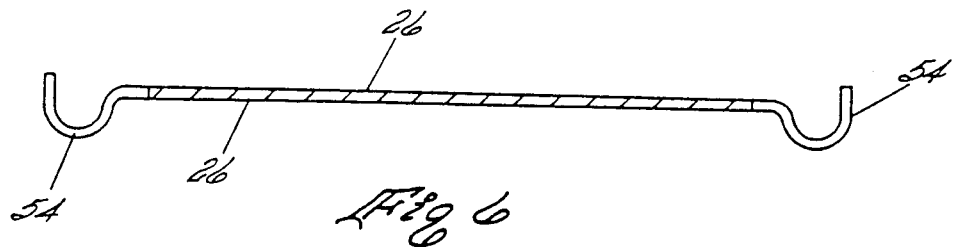
FIG. 6 is a sectional view of the support end along Section lines 6—6 showing the formed cable clamps of FIG. 5.

FIG. 6, which Is a section taken along section line 6—6 of FIG. 5, shows the support end 26 and the position of the extended deflectable cable clamps 54 before receiving a cable.

Figure 7:
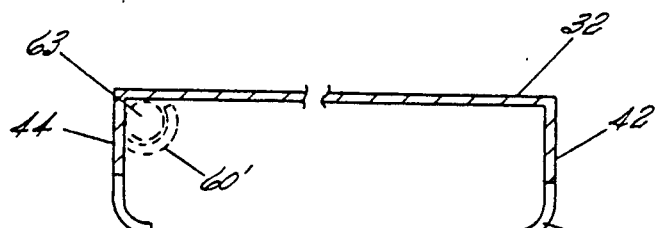
FIG. 7 is a sectional view of the head/slider end along Section lines 7—7 showing the second style of formed cable clamps of FIG. 5.

FIG. 7 is a sectional view showing the relationship between the head/slider loading end 32, the inverted spaced load rails 42 and 44 and the shape of the deflectable cable clamp 60 integral with the load rails 42 and 44. The formed position of the deflectable cable clamp 60 is shown in phantom as 60' which encloses a cable shown by a dashed circle 63.

Figure 8:
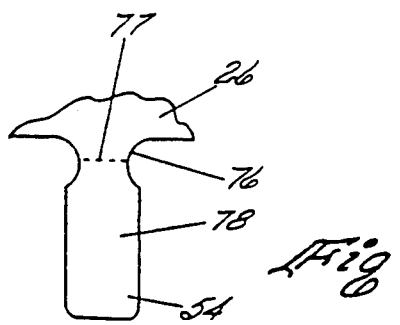
FIG. 8 is a pictorial representation of an unformed, extended cable clamp located at the support end.

FIG. 8 illustrates in greater detail the structure of the extended arcuate-shaped cable clamp 54 formed on support end 26. Specifically, the extended arcuate-shaped cable clamp 54 is formed as part of the support end 26 in the following manner. The extended arcuate-shaped cable clamp includes the elongated bendable tang 78 having a fixed end and a deflectable end, with the fixed end thereof integral with the support end 26. The deflectable end of the elongated bendable tang 78 extends from the support end 26 in a substantially planar direction therefrom when in the unformed condition as shown in FIG. 8. However, when the elongated bendable tang 78 is formed it is into the shape as shown in FIG. 7. A pair of spaced undercut sections, shown as 76 in FIG. 6, are formed in and one on each side of the fixed end of the tang 78. The undercut sections 78 have a depth which approximates about one-fourth of the width of the tang 78.

This permits the tang 78, when formed around a cable, to be easily deflected due to the reduced thickness of the tang 78 at the undercut sections 76. The tang 78 can be deflected into a number of desired positions such as beside the support end or under the elongated slider arm to hold the cable in a desired located relative to the elongated slider arm.

In the preferred embodiment, the arcuate-shaped bendable tang 78 has a width in the order of 30 mils (0.60 mm) and a selected length which enables the tang 78 to be deflected in a radius of curvature of about 10 mils (0.20 mm). The deflection or forming commences at dashed line 77. The radius of curvature is illustrated in FIG. 6. The arcuate-shaped tang 78 cooperates with the undercut sections 76 to permit easy positioning thereof, when attached to a cable, relative to the support end.

Figure 9:
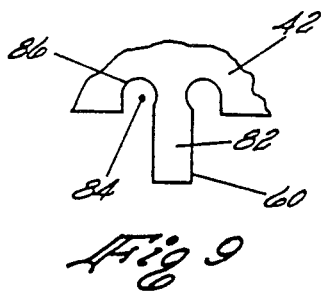
FIG. 9 is a pictorial representation of an unformed deflectable cable clamp located formed in the inverted spaced load rails.

FIG. 9 illustrates the structure of the deflectable cable clamps 60 which are integral with the load rails 42 and 44. The deflectable cable clamp 60 includes a tang 82 which has a pair of undercuts 86 formed on each side thereof defining a circular periphery which forms an open section 84 at the juncture of where the tang 82 is integral with the load rail; e.g., load rail 42.

In the preferred embodiment, the undercuts 86 have a depth which approximates the radius into which the tang is capable of being deflected. This results in the top of the deflected tang being at substantially the same level as the top of the support structure, which in the preferred embodiment is the outer edge of the load rail. The profile of the deflected tang to be substantially the same as that of the supporting structure, which in the preferred embodiment, is the load rail.

Figure 10:
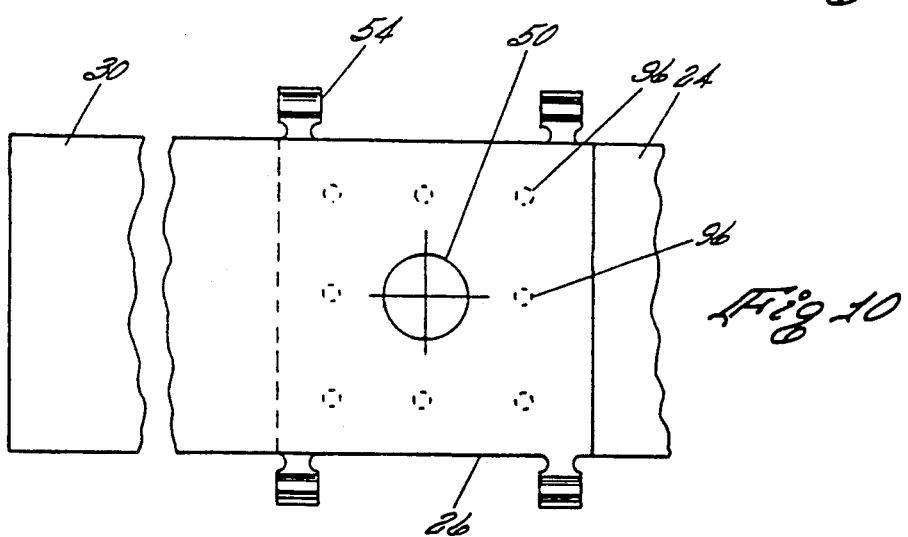
FIG. 10 is a partial pictorial representation of an arm mounting support operatively attached to the support end of the head/slider suspension assembly.

FIG. 10 illustrates support end 26 operatively attached to the arm mounting support 30. The support end 26 is welded or adhesive bonded to the plate section of arm mounting support 30 as is illustrated by weld spots 96. Opening 50 is used as an alignment means to ensure proper positioning of the support end 26 to the arm mounting support 30.

Figure 11:
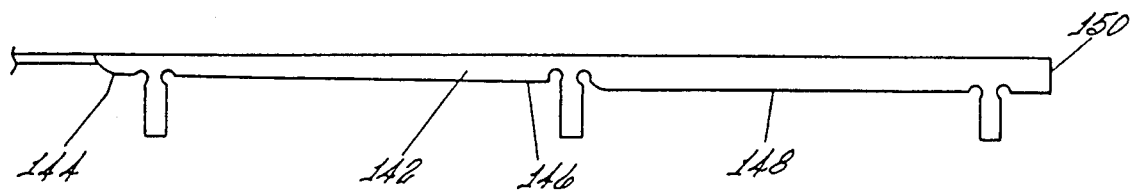
FIG. 11 is a side plan elevation view of the outer edge of an inverted raised load rail having a stepped outer edge, the height of which is equal to the difference in height between the predetermined height of the support end and the selected height of the head/slider loading end.

FIG. 11 illustrates a different embodiment of the magnetic head slider suspension assembly of FIGS. 1 through 4. In the embodiment of FIG. 11. The pair of inverted spaced, raised load rails, shown generally as 142, includes a means for defining a stepped, outer edge, wherein the step 146 is located away from the head/slider loading end. The head/slider loading end has a height, shown generally in 150. The height of the step 146 is equal to the difference between the predetermined height of the spaced raised load rails at the head/sliding loading end, having a height 150, and a selected height of the rails at the support end shown by selected height 144. The selected height 144 is less than the predetermined height 150 such that the height of the outer edge 148 near the head/slider loading end is greater than the height 144 near the support end.

Figure 12:
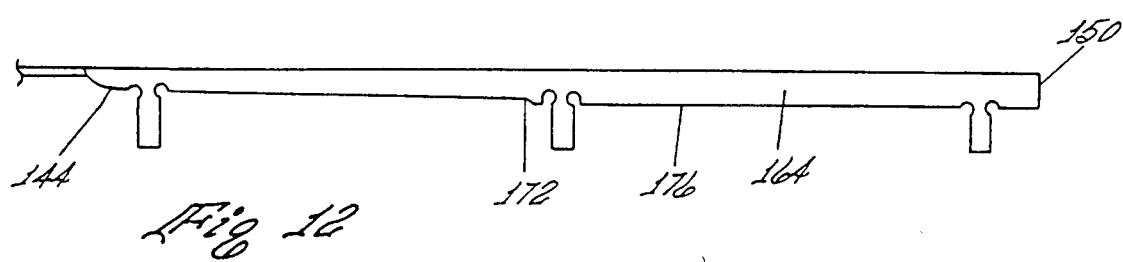
FIG. 12 is a side plan elevation view of an outer edge of an inverted raised load rail having a stepped outer edge and a tapered edge to accommodate for the difference in height between the predetermined height of the support end and the selected height of the head/slider loading end.

FIG. 12 illustrates a magnetic head slider suspension assembly of yet another alternate embodiment compared to that of FIGS. 1 through 4 and FIG. 11. The pair of inverted spaced, raised load rails, shown generally in 164, include means for defining a combination of uniform height sections and a stepped-tapered outer edge section of a load rail, wherein the step 172 or beginning of the taper is located away from the head/slider loading end having a height 150. The height of the step 172 can be less than the predetermined height 150 at the head/slider loading end with a smaller selected height 144 at the support end. The predetermined height 150 at the head/slider loading end is greater than the selected height 144 such that the height of the outer edge 176 near the head/slider loading end is greater than the height thereof near the support end. As a result, the portion of the outer edge which extends from the step 172 to the support end, is tapered at an angle to compensate for the difference in height between the height of the step 172 and the predetermined height 150 at the support end.

It is envisioned that one or more steps could be located intermediate the support end and the head/slider loading end. For example, the height of the outer edge could be adjusted by use of a single step, or a plurality of steps, or at least one step together with a tapered edge or any combination thereof. As illustrated in FIGS. 11 and 12, the load rails include means for defining an outer edge wherein the commencement of a sloping section thereof is located away from the head/slider loading end. The outer edge that extends from the height of the head/slider loading end may be formed to have a shape to compensate for the difference in height between the selected height of at the support end and the predetermined height at the head/slider loading end.

Figure 13:
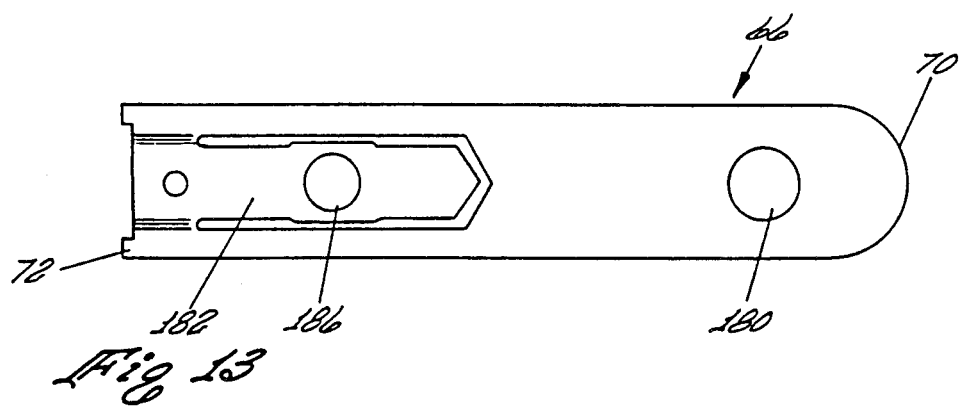
FIG. 13 is a top view of a flexure gimbal adapted to be operatively attached to the head/slider loading end of a magnetic head suspension suspension assembly having inverted spaced load rails for supporting a head/slider.
Figure 16:
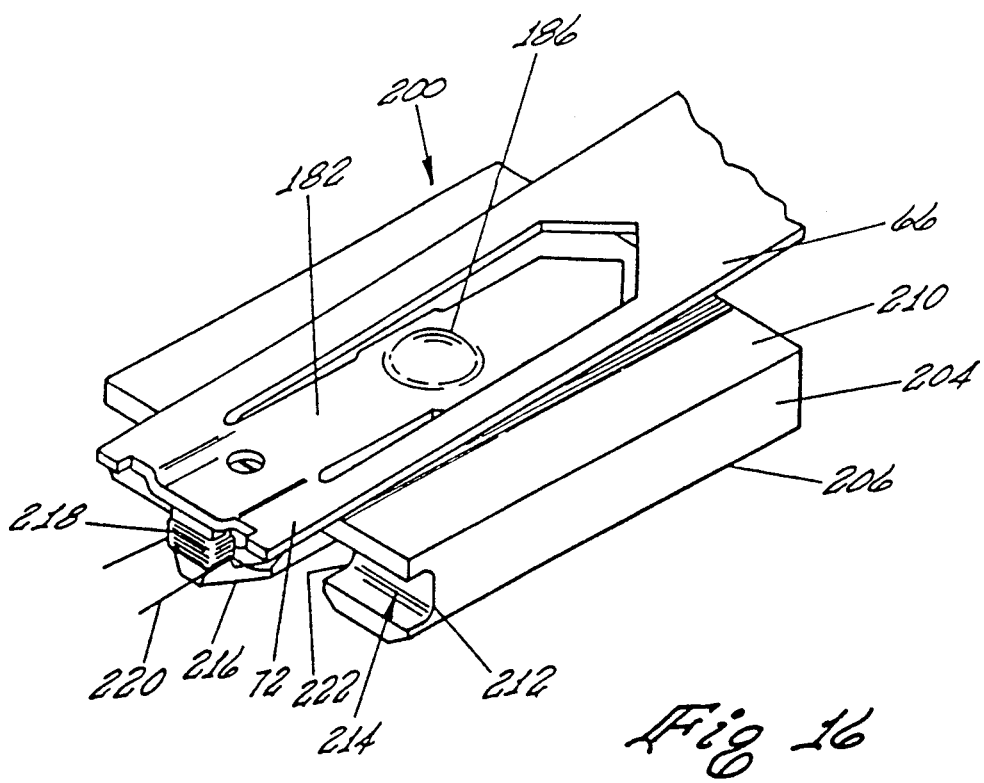
FIG. 16 is a partial perspective view of a microminimonolithic head/slider that is operatively attached to one end of the flexure beam of FIG. 13.

FIG. 13 illustrates the details of the structure of the flexure gimbal 66 illustrated in FIG. 11. The flexure gimbal 66 has first end 70 which is adapted to be operatively attached to the head/slider loading end 32 of the head slider suspension assembly as shown in FIG. 1. The flexure gimbal 66 is preferably operatively attached In the vicinity of opening 180 to the head/slider loading end. The second end 72 of the gimbal beam has a deflectable, elongated leaf spring member 182 which is integral with and supported by the second end 72. The deflectable, elongated leaf spring member 182 is essentially a cantilever beam structure and is used to support a magnetic head slider for flying on an air bearing surface over the surface of a rotating disc. A dimple 186 is formed in the deflectable, elongated leaf spring 182 which is used to facilitate the supporting of the magnetic head slider from the flexure beam as is illustrated in FIG. 16.

Figure 14:
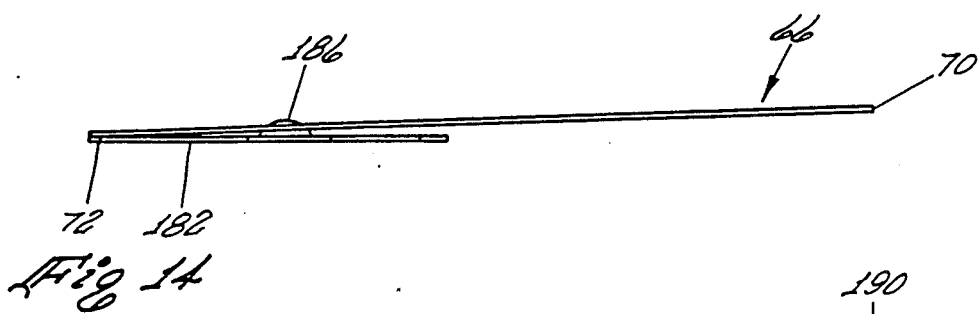
FIG. 14 is a side plan view of the flexure gimbal of FIG. 13.

FIG. 14 shows the relationship between the main structure of the flexible gimbal 66 and the deflectable elongated leaf spring 182. The leaf spring 182 can be fabricated to be integral with the main structure of the flexure gimbal 66, and this can be accomplished by stamping or chemical etching of the flexure gimbal 66.

It is also envisioned that the main structure of the flexible gimbal 66 could be fabricated as one element and the deflectable, elongated leaf spring 182 as a second element. The two elements could then be fabricated into a flexure gimbal subassembly to form the flexure gimbal.

Figure 15:
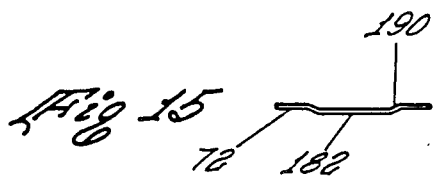
FIG. 15 is a left front plan view of the flexure gimbal of FIG. 13.

FIG. 15 is a left end view of the flexure gimbal of FIG. 14 showing that an indentation 190 is formed in the second end 72 such that the deflectable, elongated leaf spring 182 is slightly separated from the main structure of the flexure gimbal 66 and independently moveable with respect to the main structure.

Any appropriate head slider can be used with the magnetic slider suspension assembly described hereinabove. FIG. 16 illustrates the preferred embodiment of a magnetic head slider, shown generally as 200, which is used with the magnetic head slider suspension assembly as described herein. The magnetic head slider 200 is operatively attached to the flexure gimbal 66, which is, in turn, operatively attached to the head/slider loading end 32 of the magnetic head slider suspension assembly as shown in FIG. 1. In the preferred embodiment, the magnetic head slider is bonded to or attached to the underside of leaf spring 182. Typically, an epoxy or adhesive is used to securely bond or attach the magnetic head slider to the leaf spring. Depending upon the application, an electrically conductive or non-conducive adhesive or the like may be used. If an epoxy is used, the epoxy can be cured using known state of the art curing techniques such as, for example, heating in an oven (e.g. oven curing) or by exposing to UV radiation. The selection of an appropriate epoxy is well known to persons skilled in the art, and need not be discussed in detail herein. The magnetic bead slider assembly 200 includes a slider body 204 having an air bearing surface 206 and an opposed, spaced, parallel surface 210.

The magnetic head slider 200 includes a "C" shaped magnetic core 216 which is bonded to the slider loading 204. The arm of the "C" shaped magnetic core 216 nearest the air bearing surface 206 functions as one of the two magnetic pole pieces and the trailing edge 214 of the slider body 204 is formed to function as the other pole piece as described hereinbelow.

The "C" shaped magnetic core includes coil windings 218 having leads 220 which electrically connected to leads of a cable which pass from the head slider loading end 32, through a tubular member to the support end 26 of the head/slider flexure as shown in FIG. 17.

By utilizing the teachings of the present invention, the magnetic head slider assembly, as a separate component, has an overall height of approximately 0.034 inches (0.86 mm) which allows for a lower profile. A lower profile, that is the dimension in the "z-height" direction associated with a rotating magnetic disk, is highly desirable when the magnetic head slider assembly is attached to and used with a magnetic head slider suspension assembly. Also, the magnetic head slider assembly using the teachings of this invention has a smaller physical size, lower mass, and a more efficient core geometry. Also, the "C" shaped magnetic core can be easily bonded to the magnetic head slider by using the teachings of this invention.

A transverse slot 212 is formed in the trailing edge 214 of the magnetic head slider, body 204, as shown in FIG. 16, to control the angles of the elements defining the pole piece. Specifically, the internal core apex angle can be increased to approximately 90° total. Preferably, the 90° angle is split approximately equally, i.e. each pole piece being about 45°, between the lower end of the "C" shaped magnetic core and the lower outer edge which defines the transverse slot. By increasing the internal core apex angle, a decrease in core apex flux leakage is obtained, which directly reduces the core apex flux leakage losses and decreases the head inductance. As a result of the above geometry, an increase in core read efficiency and write field strength is obtained. The addition of a horizontal slot 212 to the slider trailing edge 214 physically interposes a larger air gap between the trailing edge of the magnetic head slider, on one hand, and on the other hand, the lower leg of the "C" shaped magnetic core.

As a result, the core efficiency is increased and a portion of the actual core opening or cavity is moved into the slider body, which facilitates easier coil winding as described herein.

Two spaced vertical slots 222 are formed into the trailing edge 214 of the magnetic head slider, body 204, one on each side of and adjacent to the "C" shaped magnetic core. The vertical slots 222 are formed by the removal of magnetic material of the slider located in the vicinity of the "C" shaped magnetic core. The so formed vertical slots 222 further reduces flux leakage losses and parasitic inductance between the magnetic core and the slider. Also, the vertical slots 222 facilitate coil winding due to the addition of space or a larger cavity which is present within the area of the magnetic core itself.

FIG. 17 illustrates a typical rotating disc memory assembly having spaced discs 250 and 252. An actuator or positioner, shown generally as 254, includes means for supporting the magnetic head slider suspension assemblies 256 from a support block, of which support block 258 is typical. The suspension assemblies 256 each have a magnetic head slider, shown generally as 260, operatively attached thereto as described hereinabove. As such, the magnetic head sliders 260 fly, on its one or more air bearing surfaces, over the surface of discs 250 and 252. The magnetic head slider suspension assemblies 256 can be moved from the "loaded position", as illustrated on FIG. 17, to an "unloaded position" by displacement of the magnetic head slider suspension assemblies 256 in the direction away from the disc surface. When the magnetic head sliders are moved into the "unloaded position", the entire actuator 254 is then moved relative to the disc 250 and 252 to transport the magnetic head slider suspension assemblies 256 away from the discs 250 and 252.

Magnetic head slider suspension assemblies have certain mass and stiffness and the central arm section or load beam thereof exhibits various modes of torsional and other vibrations during track-to-track positioning. In the frequency bandwidth of interest, say 0 hertz to 6,000 hertz, the load beam may have in the order of 5 to 10 vibration modes. Each vibration mode is discrete, has a specific mode shape, and a frequency of oscillation associated therewith. The mode of lowest frequency vibration is the "fundamental mode," and the higher frequency vibration modes, termed harmonic vibration modes, are referred to as "higher order modes."

The prior art head slider suspension assemblies including specifically the standard mini-suspension assemblies, such as for example, the IBM 3370 type head slider suspension assembly or the Whitney type suspension assembly, have a load beam which is generally triangular-shape wherein the head/sliding loading end has a substantially smaller geometrical dimension than the support end.

In a disc drive system using head slider suspension assemblies, the load beam portion of the head slider suspension assembly exhibits mode vibrations when its is excited into vibration by a driving force resulting from the track-to-track motion of the positioning system. Typically, the mode shapes of vibrations that are activated by the positioning system are those modes which are "torsional" in shape.

In such disc drive systems, the electronics and a feed back servo loop are used to maintain track-to-track position between the head slider and disc. Electrical filters having a selected bandwidth are normally included in the feedback servo loop electronics to remove spurious signals produced by the fundamental and higher order mode vibrations of the head slider suspension assembly. Absent such electronical filters, the servo feedback loop would experience overloading during the short periods of time when the vibrations are occurring. As a result, it is necessary to provide some settling time for the head slider suspension assembly before data transfer commences.

The drive speed of the positioning system in a typical disc drive system is selected to accommodate vibrations for both the: (i) fundamental mode; and (ii) second order or higher order modes. This is the major factor which determines the "settling time" and response time for data transfers in a disc drive system.

In the prior art (or conventional) head slide suspension assembly, a fundamental mode vibration will occur at approximately 2,000 hertz to 3,000 hertz with higher order modes vibrations occurring at various frequencies above that of the fundamental mode, usually in the 3,000 hertz to 6,000 hertz range.

Figure 18:
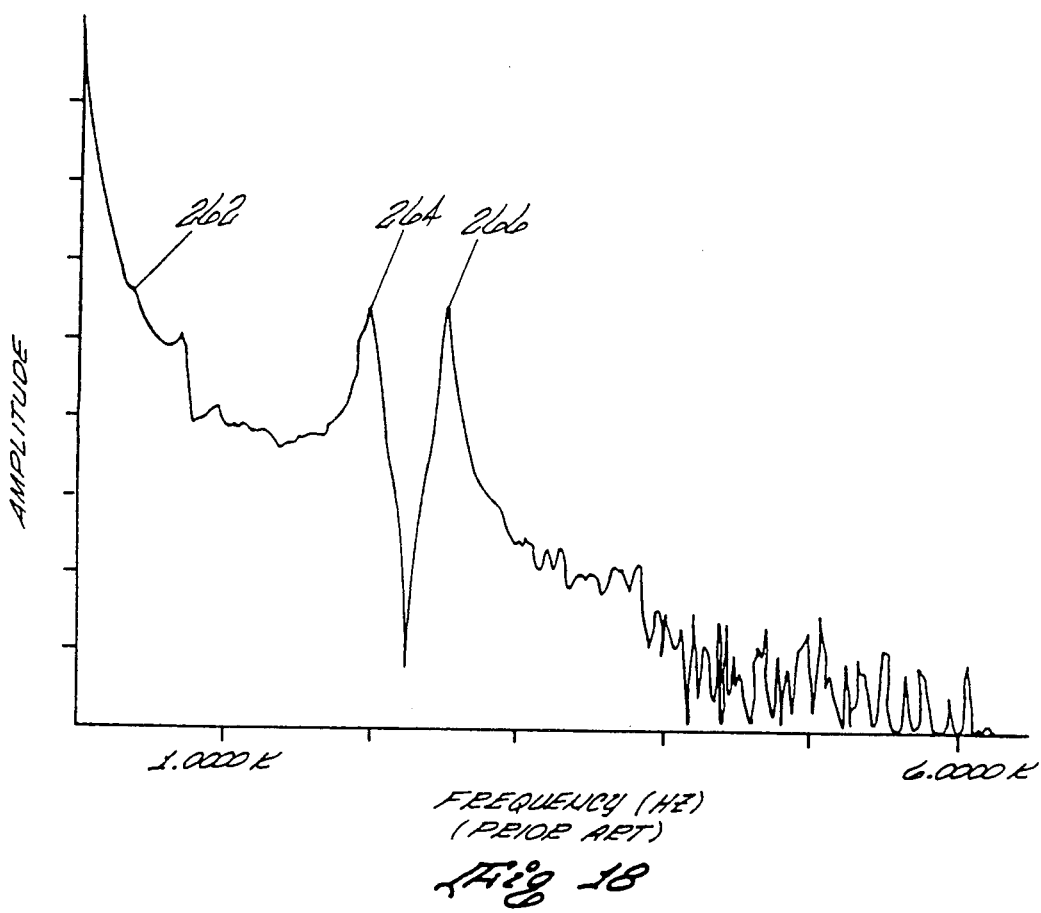
FIG. 18 is a graph of amplitude of torsional mode vibrations plotted as a funtion of frequency for a generally triangular shape load beam of a prior art magnetic head suspension assembly.

FIG. 18 depicts a graph of the results of vibration testing for a generally triangular shaped load bearing arm of the IBM 3370 type or Whitney type suspension assembly. The graph of FIG. 18 plots the relative amplitude of vibrations of a generally triangular-shaped load beam as a function of frequency in hertz (hz). Curve 262 shows that the amplitude of vibrations of the triangular-shaped load beam decrease from 0 hertz to about 1,000 hertz and then the load beam experiences harmonic vibrations at about 2,000 hertz to about 2,700 hertz as depicted by peaks 264 and 266. Above about 2,700 hertz to about 6,000 hertz, the amplitude of the higher order modes of vibration decreases from the amplitude of peak 266, through the 3,000 hertz and 4,000 hertz frequency range to a substantially uniform amplitude at about 5,000 hertz to 6,000 hertz.

Figure 19:
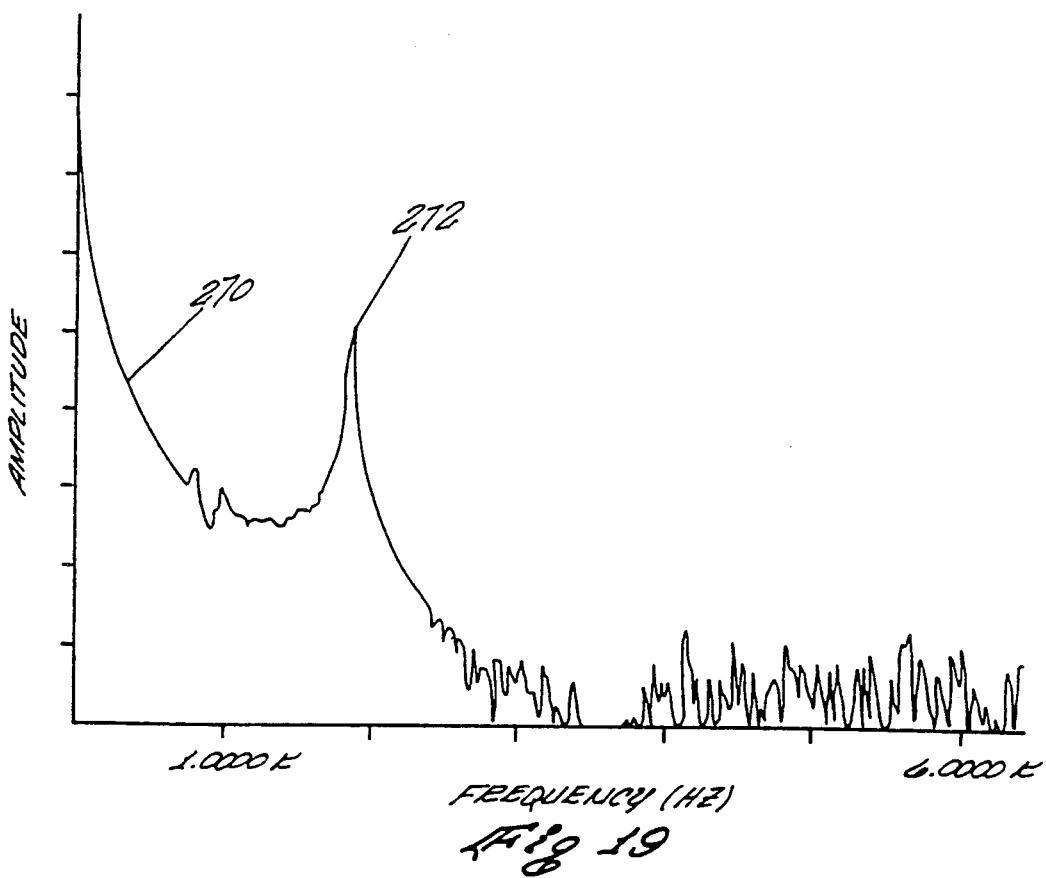
FIG. 19 is a graph of amplitude of torsional mode vibration plotted as a function of frequency for a generally rectangular shape load beam used in the magnetic head suspension assembly of the present invention.

FIG. 19 shows a graph of the amplitude of vibrations of a generally rectangular shaped load beam plotted as a function of frequency (hz) for the head slider suspension assembly of the present invention. As is depicted by curve 270, the head/slider suspension assembly experiences substantially the same vibration characteristics as the prior art suspension assembly to about 2,000 hertz where the fundamental mode of vibration occurs, and that condition is shown by peak 272. Thereafter, the vibration amplitude drops rapidly such that a substantially uniform amplitude is experienced starting about 3,000 hertz up to about 6,000 hertz, In the load beam structure of the present invention, the above-described improvement appears to result from the torsional stiffness of the load beam due to its generally rectangular shape. It further appears that the increased 'torsional' stiffness results in the modes of vibrations, other than the fundamental mode, being shifted to higher frequencies. Specifically, in the present invention, the torsional stiffness of the load beam has shifted the second torsional mode vibrations from the range of about 3,000 hertz to about 4,000 hertz range, associated with the prior art suspension systems, up to a frequency greater than 6,000 hertz.

Disc drive positioning systems servo feedback loops typically do not respond to frequencies above 6,000 hertz, and the bandwidth of concern is in the 0 hertz to about 6,000 hertz range. As such, electronic filtering of the servo loop driving electronics above the 6,000 hertz range is not required.

The structure of the load beam of the present invention does exhibit fundamental mode vibration, and this does require electrical filtering in the servo loop feedback electronics in the 2,000 to 4,000 hertz range. However, elimination of vibrations of the higher order modes from the 4,000 hertz to 6,000 hertz range, in turn, eliminates the need for electronic filters above the 4,000 hertz range.

The utility of this feature of the invention is that the cost for electronic filtering is reduced, and the disc drive system has faster disc drive data access due to faster head slider positioning and a reduction in settling time.

It is well known in the rotating magnetic disc memory storage system art that the industry is advancing to have a tighter packing density and to reduce the disk-to-disk spacing. As a result, magnetic head slider suspension assemblies must have a lower profile. The reduction in height of the magnetic head flexure, when coupled with reduction in height of the improved magnetic head slider suspension assembly of the present invention, permits use of low profile magnetic head sliders resulting in improved rotating disk memory systems. Typically, the "z-height", that is the distance between the air bearing surface(s) of the magnetic head slider and the mounting surface of the support, are in the order of 0.059 inches (1.49 mm). The combination of the "Z-height" of the magnetic head slider, the required arm thickness and the suspension assembly results in about 200 mils (5.06 mm) disc-to-disc spacing in the prior art devices. By reducing the overall height of the magnetic head slider suspension assembly of the present invention, a substantial decrease in disk-to-disk spacing can be obtained. Thus, the use of the magnetic head slider having a low profile as that of the present invention can he used with improved magnetic head suspension assemblies also having a low profile. The magnetic head slider, in combination with a magnetic head slider suspension assembly, having a lower profile, results in an improved magnetic head slider suspension assembly which can be used to provide the additional spacing advantage required for accommodating the smaller distances in the improved state-of-the-art rotating single or multi-disk rotating memory systems.

What is claimed is:

1. A load beam adapted for use in a head slider suspension assembly comprising
 a load beam having a generally rectangular shape and including means for defining a support arm end and a head/slider loading end, said load beam having a torsional vibration mode characteristic which, upon said load beam being excited by a driving force, produces a fundamental mode vibration in the range of about 2,000 hertz to about 4,000 hertz and higher order mode vibrations above about 6,000 hertz.

2. The load beam of claim 1 wherein the fundamental mode vibration occurs at about 2,000 hertz and the higher order mode vibrations occur above 6,000 hertz.

3. The load beam of claim 1 wherein said load beam includes means for defining at one end thereof a support end which is adapted to be operatively coupled to an arm mounting support; and
a raised load rail extending substantially perpendicular from said load beam, said raised load rail having a length which extends from a first rail end located near said one end to a second rail end located about at a head/slider loading end which is positioned opposite to said one end.

4. The load beam of claim 3 wherein the height of the raised load rail is the same at both said first rail end and said second rail end.

5. The load beam of claim 3 wherein the height of the first rail end is a predetermined height and the height of the second rail end is a selected height which is one of a height equal to and less than said predetermined height.

6. The load beam of claim 3 further comprising
a second raised load rail extending substantially perpendicular from said load beam in the same direction as and spaced from said raised load rail, said raised load rail and said second raised load rail defining a pair of substantially parallel spaced raised load rails.

7. The load beam of claim 6 wherein said raised load rails extend in a selected direction from said load beam and wherein said selected direction is in a direction opposite to the direction in which a head/slider assembly is supported from said head/slider loading end.

8. The load beam of claim 6 wherein said raised load rails extend in a selected direction from said load beam and wherein said selected direction is in the same direction in which a head/slider assembly is supported from said head/slider loading end.

9. The load beam of claim 6 wherein the heights of said first rail end and second rail end on each of said raised load rails are the same.

10. The load beam of claim 6 wherein the height of the first end on each of said raised load rails is a predetermined height and the height of the second rail end on each of said raised load rails is a selected height which is one of a height equal to and less than said predetermined height.

11. The load beam of claim 6 wherein each of said raised load rails has an outer edge which extends from said first rail end to said second rail end, said load rails including means defining a tapered outer edge along a portion of each of said load rails.

12. The load beam of claim 6 wherein each of said raised load rails has an outer edge which extends from about said support end to about said head/slider loading end, said load rails including means for defining a stepped outer edge wherein the step is located away from the head/slider loading end and the height of the step is equal to the difference between a predetermined height of said spaced, raised load rails at said head/slider loading end and a selected height at said support end, said selected height being greater than said predetermined height such that the height of said outer edge near the head/slider loading end is less than the height thereof near said support end.

13. The load beam of claim 6 wherein each of said raised load rails has an outer edge which extends from about said support end to about said head/slider end, said load rails including means for defining a tapered outer edge wherein the tapered outer edge commences at a point which is located away from the head/slider loading end such that the height of said outer edge near the head/slider loading end is a predetermined height which is greater than the height thereof near said support end which is a selected height and wherein the outer edge of each said load rail extending from said head/slider loading end to said support end is tapered at an angle to compensate for the difference in height between the selected height at said support end and the predetermined height at said head slider loading end.

14. The load arm of claim 3 further comprising
an arm mounting support operatively coupled to said support end.

15. The load beam of claim 3 further comprising
a flexure gimbal for supporting a head/slider having an air bearing surface having a first end and a second end, said first end being operatively attached to said head/slider loading end of said load beam forming a cantilever loading beam with said second end of the flexure gimbal extending beyond the head/slider loading end of said load beam.

16. The load beam of claim 3 further comprising
a flexure gimbal having a first end and second end, said first end being operatively attached to the head/slider loading end and said second end having an elongated leaf spring operatively attached thereto; and
a head/slider having an air bearing surface operatively attached to the elongated leaf spring.

17. The load beam of claim 16 wherein the head/slider extends in the same direction as said raised load rail.

18. The load beam of claim 16 wherein the head/slider extends in a direction opposite to the raised load rail.

19. A magnetic head slider suspension assembly comprising
an elongated slider arm which extends along an elongated axis and which includes a load beam having a generally rectangular shape and including means for defining a support arm end and a head/slider loading end, said load beam having a torsional vibration mode characteristic which, upon said load beam being excited by a driving force, produces a fundamental mode vibration in the range of about 2,000 hertz to about 4,000 hertz and higher order mode vibrations above about 6,000 hertz, said load beam further including means for defining at one end thereof a support end having a predetermined width and which is adapted to be operatively coupled to an arm mounting support and defining at its other end a head/slider loading end having a width which is slightly less than the predetermined width of said support end, said head/slider loading end being located along said elongated axis and in an opposed, spaced relationship to said support end; and
a pair of spaced, raised load rails extending substantially perpendicular from said load beam and in a selected direction relative to that of a head slider adapted to be supported from the head/slider loading end, each of said raised load rails having a length which extends from a first rail end located near said support end to a second rail end located slightly forward of said head/slider loading end, each first rail end of each said pair of said load rails having a selected height and each second rail end of each of said pair of load rails being located adjacent said head/slider loading end having a predetermined height which is one of equal to and greater than said selected height.

20. The load beam of claim 19 wherein the fundamental mode vibration occurs at about 2,000 hertz and the higher order mode vibrations occur above 6,000 hertz.

* * * * *